United States Patent Office 3,314,905
Patented Apr. 18, 1967

3,314,905
ACYCLIC ORGANIC ACID-HALOGENATED EPOXY COMPOUND ESTER MODIFIED PROTEIN
Stewart B. Luce, La Grange, and Harland H. Young, Western Springs, Ill., assignors to Swift & Company, Chicago, Ill., a corporation of Illinois
No Drawing. Filed Mar. 16, 1962, Ser. No. 180,345
10 Claims. (Cl. 260—8)

The present invention in general relates to a new and useful composition of matter. More specifically, this invention comprises reaction products of a proteinaceous material and certain esters to form a substance which is capable of polymerization.

Historically, workers have attempted for several years to find a commercially practicable method for coupling proteinaceous material. Numerous chemical cross-linking agents have been investigated from aldehydes to polyamines or polycarboxylic acids and their anhydrides. In almost every instance in which coupling occurred the disadvantages far outweighed the advantages. These disadvantages include insolubility in suitable solvents, the inability to control the reaction or stop it at a desired point, and the production of heterogeneous products that do not lend themselves to the formation of continuous films that are necessary for adhesion. Another disadvantage is the high cost of reactants.

Therefore, it is an object of this invention to produce a new and useful product utilizing proteinaceous materials.

An additional object is to provide modified protein material which can be subsequently polymerized.

It is also an object of this invention to provide modified protein material containing reactive functional groups.

A further object is to produce a proteinaceous material which is soluble in suitable solvents and which produces a homogeneous product which lends itself to the formation of continuous films necessary for adhesion.

Other objects will be apparent to one skilled in the are from the following detailed description.

Generally, the invention is concerned with the treatment of proteins and hydrolytic degradation products of proteins to form valuable products which are capable of polymerization. The modified protein materials are prepared by reacting certain esters with the desired protein. This invention also relates to new and useful polymers which are produced by the polymerization of the modified proteins. Many of the synthetic polymers can be used as flocculating agents, adhesives for wood products and for other uses set out more fully below. Also contemplated are products produced by copolymerization of the modified protein with vinyl monomeric materials. Since the ester which is used for coupling can be polyfunctional, this invention is also concerned with the coupling of two or more proteinaceous fragments. As used herein the term "protein" is intended to include the hydrolytic degradation products of proteins.

More specifically, the modified proteins of this invention are prepared by the treatment of an aqueous solution of protein, preferably a mild alkaline solution of pH 8-10, with an ester of a polymerizable or polyfunctional carboxylic acid so as to condense the ester with the protein. The reaction is usually carried out for about 1 hour at a temperature of about 40–80° C. Such a reaction is believed to be as follows, using the methacrylic acid ester of glycerol chlorohydrin on an aqueous alkaline solution of protein:

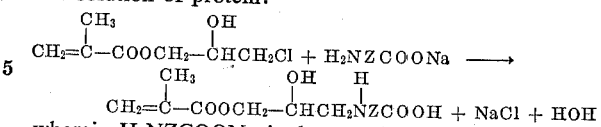

wherein H₂NZCOONa is the proteinaceous material.

The modified protein still having a hydrogen attached to the nitrogen would be expected to be reactive with excess glycerol chlorohydrin ester. Furthermore, the amide groups of peptides have available hydrogen which would also be reactive at this position. However, it is not desired to limit the invention to any particular theory of operation, as it has been definitely observed that under the conditions set forth, there is a definite improvement in the properties without regard to the particular mechanism involved in the reaction.

As can be seen from the above reaction, the modified protein now contains an unsaturated group which renders the product polymerizable. Whether all available amino groups or only a few in the protein are reacted is immaterial for it has been found that the products polymerize in aqueous solutions when heated in the presence of peroxides.

Protein materials with which the halohydrin esters couple include all those which can be placed in an aqueous dispersion on the alkaline side. The proteins can be of animal origin and include both simple and conjugated proteins. Included are soybean, zein, cottonseed, peanut and casein of the alkaline soluble group, as well as their seed meals and hydrolysis products. A second group includes the keratins, including hoof, horn, wool, and feathers. A third group comprises collagen, glue, gelatin and their hydrolysis products such as stick. All protein materials or their derivatives are included whether native, denatured or degraded through hydrolysis. Of course, peptides whether natural or synthetic, as well as amino acids, are included in the term "protein."

As stated above, the present invention relates to products produced by the reaction of proteinaceous material with esters. These esters are usually prepared by reacting an acyclic organic acid with a halogenated epoxy compound. For example, the methacrylic acid ester of glycerol chlorohydrin is produced by reacting methacrylic acid with epichlorohydrin in the presence of an amine such as triethylamine or pyridine.

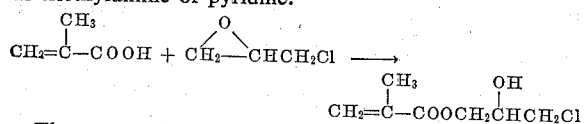

The types of acids which can be used are best illustrated by the following formula: RCOOH wherein R is an acyclic organic radical of about 2–20 carbon atoms and is usually unsubstituted except for carboxyl groups. The most suitable acids are those wherein R is an unsaturated radical containing up to about 10 carbon atoms. Specific acids include acrylic, methacrylic, crotonic, sorbic, and itaconic acids, etc. Also included are the polycarboxylic acids such as malonic, succinic, glutaric, adipic, azelaic, sebacic, fumaric, and maleic, etc.

The halogenated epoxy compounds are of the formula:

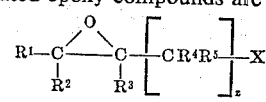

wherein X is chlorine, fluorine, bromine or iodine, z is an integer of about 1–10 and $R^1$, $R^2$, $R^3$, $R^4$, and $R^5$ are hydrogen or alkyl radicals of about 1–20 carbon atoms. However, z is usually less than 8 and the alkyl radicals usually contain up to about 8 carbon atoms. Specific compounds include epichlorohydrin, epibromohydrin, epifluorohydrin, epiiodohydrin, 1-bromo, 3,4-epoxy butane, 1-chloro 2,3-epoxy octane, 1-chloro 3,4-epoxy hexane, etc.

The ester can be either a monoester or diester, depending upon the amount of polycarboxylic acid reacted with the halogenated epoxy compound. For example, with epichlorohydrin, one can produce a diester such as the diester of fumaric acid:

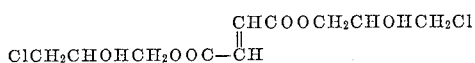

or the monoester, such as the monoester of adipic acid:

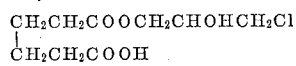

The monomeric polymerizable chlorohydrin esters, such as the reaction product of acrylic, methacrylic, crotonic, fumaric, maleic, and itaconic acids with epichlorohydrin, condensed with the proteins or their hydrolysis products under aqueous alkaline conditions so as to introduce the polymerizable group originating from the acid. The amount of acrylation, for example, that can be effected with any protein material is a function of the number of alkylatable amine functions present. With an amino acid this reaction proceeds mole for mole. In proteins and their degradation products, one mole of the acrylic acid ester of glycerol chlorohydrin reacts with each free amino group which has been liberated by fixing the carboxyl groups with alkali. In the case of glue, for example, or even gelatin there are 45 milli-equivalents of $NH_2$ per 100 grams of protein as determined by a Van Slyke determination. 45 milli-equivalents of the methacrylyl glycerol chlorohydrin would be:

$$\frac{45}{1000} \times \frac{178}{1}$$

or 8.0–8.5 gms./100 gms. of glue or gelatin. This corresponds to a methacrylated protein product containing 92% protein in the final product prior to any polymerization.

If the ester is condensed with amino acids or simple peptides, the preferred ratio of proteinaceous residue to polymerizable groups would be approximately 1–1. However, compositions wherein a large excess of either reactant is employed are useful. With glue and gelatin or soy and casein proteins this ratio would climb to about 10 or 12 or more to 1.

The condensation products of this invention are not greatly different, if different at all, from the parent protein in physical properties such as solubilities, viscosity and jelly strength. However, they do undergo two types of polymerization reactions which are not possible with the parent unmodified protein. These are:

(a) polymerization of the condensate itself using a peroxide type catalyst whereby there is an increase in molecular weight and viscosity;
(b) copolymerization with well known vinyl monomers using the peroxide catalyst.

Vinyl acetate greatly catalyzed the polymerization of the condensate itself, even when less than 1% vinyl acetate was used based upon the protein-chlorohydrin condensate. As more of the vinyl acetate was used, less and less solubility in water is noted. At low levels of the protein-chlorohydrin reaction product, such as 2–10% solutions in water, it was found that vinyl acetate not only copolymerized but results in a polyvinyl acetate type resin emulsion in which the protein fragment is an integral part of the final copolymer. Such an emulsion has possibilities of having much more resistance to creep or cold flow. Many other monomeric components such as styrene, divinyl benzene, vinyl methyl ether, vinyl chloride, acrylyl chloride, acrylic anhydride, butadiene, acrylonitrile, isopropenyl acetate, methyl isopropenyl ketone, acrylamides and a large number of the esters of acrylic and methacrylic acids are useful as the vinyl monomers.

In addition to vinyl acid esters of glycerol chlorohydrin, similar esters of saturated and unsaturated polybasic acids have been prepared. These polybasic acids form either the mono- or di-ester, depending upon mole ratios used. In the case of fumaric acid it should be noted that the diester is unsaturated and capable of polymerization. In the case of adipic acid, while saturated it should be noted that the ester being polyfunctional, different type polymerization is possible.

The dichlorohydrin esters of polybasic acids are capable of coupling two protein residues with approximated doubling of the over-all molecular weight. Obviously the polychlorohydrins from saturated polybasic acids are multifunctional rather than polymerizable in the sense of monomeric unsaturated acid groups such as those formed from acrylic or methacrylic acids. However, the unsaturated polybasic acid derivatives are both multifunctional and polymerizable.

Using this procedure, one can condense 2 moles of epichlorohydrin with a di- or polybasic acid so as to have a bischlorohydrin type of compound that would condense with and couple two or more proteins or proteinaceous fragments.

The following examples typify the products produced by this invention and the method for producing them and are to be construed as illustrative of, and not as limiting the scope of the invention.

Example I

Methacrylic ester of glycerol chlorohydrin.

A mixture of 258 g. of glacial methacrylic acid and 279 g. of epicholorhydrin was placed in a reaction flask equipped with a stirrer and reflux condenser. The system was heated to 90–95° C. with stirring and 14 g. of triethyl amine was added. An exothermic reaction occurred, necessitating cooling to maintain the temperature at 95–100° C. After about 45 minutes, the temperature started to drop so a water bath was raised, and heating supplied to keep the temperature between 90 and 100° C. for 4 hours. The mixture was then cooled and stored ready for use.

This product can be used, with no further purification, for the reaction with protein or the degradation products of proteins. If desired, the mixture can be distilled under vacuum to give a pale yellow product boiling at 115–120° C. at 7–8 mm. of Hg. This purified material had the following constants:

|  | Found | Theoretical for ester |
| --- | --- | --- |
| Sap No | 589 | 630 |
| Percent Chlorine | 19.6 | 19.6 |

The above procedure was also used for making the glycerol chlorohydrin esters of acrylic, sorbic, itaconic, maleic, fumaric, crotonic, oleic, linoleic and citric acids.

The methacrylic ester of glycerol chlorohydrin will be referred to as MACH in the following examples.

Example II

A mixture of 1200 g. of water and 1200 g. of bone glue (180 g. jelly strength) was placed in a container and heated with stirring to dissolve the glue. When the temperature reached 55–60° C. there was added 21.6 cc. of 6 N sodium hydroxide and 48 g. of MACH. The mixture was held at 55–60° C. with stirring for about 1 hour to give a colloidal product of approximately 50% solids. This product can be polymerized or copolymerized by means of typical catalysts for vinyl type polymerization.

If a larger amount of the ester is used, a water insoluble polymer can be prepared as shown in the following example.

Example III

A mixture of 300 g. of water and 100 g. of bone glue was placed in a container and heated to dissolve the glue. When the temperature reached 45–50° C. there was added 2 g. of NaOH with stirring and 10 g. of MACH. The mixture was held at 40–50° C. with stirring for 1 hour and then 3 g. of 27% hydrogen peroxide was added. The mixture was then heated to 70–80° C. and held there for 1 hour. A gel formed on cooling and on air drying it became water insoluble.

Tests were conducted to show the difference in the products obtained when the MACH was first reacted with the glue and the product polymerized, and when it was polymerized in the presence of the glue. Flocculation tests clearly showed a definite difference between the procedures.

Another experiment was run in which the MACH was first emulsion polymerized and the glue then added to the emulsion. The resulting mixture was not homogeneous, the polymerized MACH settling out at the bottom. This along with the results from the flocculation tests, shows that a definite reaction of the glue with the MACH has to be effected before polymerization to give the desired results.

Example IV 50 g. of alpha soya protein was slurried in 200 g. of cold water and 2 g. of NaOH was added. The mixture was then heated to 60–65° C. with stirring and 17.8 g. of MACH was added. This mixture was reacted for 1 hour at 60–65° C. and became quite thick. To dilute the solution, 50 cc. of water was added and then 5 cc. of 27% hydrogen peroxide was added for the polymerization. The mixture was then heated to 90–95° C. and after 20 minutes the product had become a water insoluble gel.

Example V 0.8 g. of sodium hydroxide was dissolved in 400 g. of water and 50 g. of soybean flour was added with stirring. The mixture was heated to about 80–90° C. to insure complete solution of the solubles. The system was cooled to about 55–60° C., 4 g. of MACH was added and the reaction continued for about 1 hour, during which time the pH dropped from 8 to around 7. Polymerization was accomplished by using 2 cc. of 27% hydrogen peroxide and heating the mixture to 80–95° C. for 1 hour.

Example VI 50 g. of alcohol soluble zein was slurried in cold water and 2 g. of sodium hydroxide was added. The mixture was stirred and heated to give a clear amber solution of a pH value of 10. 14 g. of MACH was added when the temperature reached 60–65° C. Upon heating for 1 hour, a brownish translucent solution resulted having a pH of about 7. The product became much lighter in color upon polymerization with $H_2O_2$ at a temperature of 90–95° C. After awhile a solid separated and the reaction stopped. The polymer was separated and washed with hot water and was found to be insoluble in sodium hydroxide.

Example VII 50 g. of casein was slurried in 250 g. of water and 9.2 cc. of 6 N sodium hydroxide was added. The mixture was heated with stirring to dissolve the particles giving a solution of pH of 8. When the temperature reached 60–65° C., 10 g. of MACH was added and reacted for 1 hour at 55–60° C. 5 cc. of 27% hydrogen peroxide was then added and the mixture heated to 85–90° C. in 10 minutes and held there. After 20 minutes, thickening started and by the end of ½ hour the mixture was very thick. On cooling, it set to a gel which was water soluble.

Example VIII 100 g. of bone glue was dissolved in 200 g. of water. Heat was applied and when the temperature reached 60–70° C., 3.6 cc. of 6 N sodium hydroxide and 8 g. of MACH were added. During this time the pH dropped from 8 to 6. The system was reacted at 65–70° C. for 1 hour and then 3 cc. of 27% hydrogen peroxide was added. The mixture was brought up to 90–95° C. in 10 minutes and held there. After 1½ hours the product had thickened but not gelled.

Example IX 200 g. of gelatin of 300 g. jelly strength was dissolved in 150 g. of water. At about 65–70° C., 16 cc. of 6 N sodium hydroxide and 20 g. of MACH were then added and the system reacted for 1 hour at 65–75° C. 0.3 g. of potassium persulfate and 7.5 cc. of 27% hydrogen peroxide were added and the mixture was then transferred to a kitchen mixer and whipped to a stiff foam. The product was air dried for 18 hours and then was dried in an oven at 130–135° C. After about 1 hour the puffed material was placed in water. It was insoluble and absorbed water much like a sponge.

Example X 100 g. of bone glue was dissolved in 200 g. of water and heated. When the temperature reached 60–70° C., 3.6 cc. of 6 N sodium hydroxide and 7.4 g. of acrylic acid ester of glycerol chlorohydrin were added and the reaction continued for about 1 hour. The product was polymerized by using 3 cc. of 27% hydrogen peroxide. The cooled final product had the appearance of smooth boiled starch.

Sorbic acid and itaconic acid esters of glycerol chlorohydrin were also reacted with proteins in the same manner as that shown above.

Copolymers of the modified protein and vinyl monomers are shown below.

Example XI 34 g. of the product from Example II was dissolved in 301 cc. of water and then 3.7 cc. of 27% hydrogen peroxide along with 225 g. of vinyl acetate monomer were added and the system heated with stirring at reflux for 3¾ hours. The product was a smooth pasty emulsion having good stability. This gave a polyvinyl acetate emulsion free of polyvinyl alcohol, the MACH-glue acting as the emulsion stabilizer. Wood bond strengths using this emulsion as the adhesive were about 80% of that of a commercial wood glue having a polyvinyl acetate base.

Example XII 100 g. of bone glue was dissoloved in 200 g. of water and at 50–60° C. there was added 3.6 cc. of 6 N sodium hydroxide and 8 g. of MACH and the mixture reacted at 55–60° C. for 1 hour. Then 10 g. of methyl mearacrylate and 3 cc. of 27% hydrogen peroxide were added and the reaction heated to 85–95° C. in 15 minutes. Refluxing occurred at the start and in another 15 minutes it had stopped. After 40–45 minutes the mixture thickened and after 1 hour the mixture was cooled to give a smooth white emulsion with very little odor of methyl methacrylate monomer and was easily dispersed in water.

Example XIII 100 g. of bone glue was dissolved in 200 g. of water and heated. When the temperature reached 55–60° C., 3.6 cc. of 6 N sodium hydroxide and 8 g. of MACH were added. The mixture was reacted for 1 hour at 55–60° C. and then 3 cc. of 27% hydrogen peroxide and 10 g. of styrene were added. After ½ hour at 90–95° C. the product began to thicken. After 1 hour it was cooled to give a smooth emulsion.

Example XIV

A mixture of 50 g. of 50% MACH-glue solution and 542 g. of water was heated to 75° C. and then 0.1 g. of potassium persulfate and 75 g. of acrylamide were slowly added so that the temperature remained at 74–75° C. Heating and stirring were continued and when the liquid mixture reached 85° C. the product began to thicken. As the product continued to thicken the temperature rose to 94° C., at which time the water bath temperature was 85° C. 50 cc. of ice water was added over a 2 minute period, maintaining the temperature at 92° C. The reaction was permitted to react for ½ hour until the temperature was down to 75° C. The product was a thick water soluble gel of about 15% solids.

*Example XV*

100 g. of bone glue was dissolved in 200 g. of water and 3.6 cc. of 6 N sodium hydroxide, 8 g. of MACH and 3 cc. of 27% hydrogen peroxide were added. The mixture was heated to 85–90° C. and after 45 minutes the mixture was very thick. 10 g. of glacial methacrylic acid was added and the stirring continued. In about 5 minutes the mixture became very thick, and started to climb the stirrer. It was cooled to give a gel which was dispersible but not truly soluble in water.

The following examples show various terpolymers involving the use of MACH-glue.

*Example XVI*

A mixture of 25 g. of 50% MACH-glue and 175 g. of water was heated with stirring and at 75° C. the following were added: 0.05 g. of potassium persulfate and a solution of 25 g. of acrylamide in 25 cc. of water. Stirring and heating were continued on a water bath and when the temperature was 92–93° C., a noticeable thickening occurred. In a minute or two the temperature rose to 94–96° C., and the mixture became quite thick. At this point, added 0.1 g. of potassium persulfate, and, through a dropping funnel, 12.5 g. of styrene monomer were added. Heating was continued on the water bath for 1 hour, maintaining a temperature of 90–95° C. The bath was then removed, and heating continued over the hot plate, with the temperature rising to 95–100° C. in ½ hour. The temperature was held for 15 to 20 minutes or slightly longer to get as complete reaction of the styrene as possible. On cooling, a smooth fairly thick emulsion resulted. The product had 19% solids. The product was used as a wood glue to give bond strength of about 80% of that obtained from a commercial polyvinyl acetate wood glue.

*Example XVII*

A mixture of 25 g. of 50% MACH-glue and 200 g. of water was heated with stirring and 0.05 g. potassium persulfate and 25 g. of acrylamide were added. The mixture continued to react, and at 92° C. began to thicken. At 95° C., 50 g. of vinylacetate monomer was added, through a dropping funnel, over a 2-minute period. The product thickened tremendously, vinylacetate refluxed rapidly, and the temperature dropped in 5 minutes to 65° C. 200 cc. of water in 50 cc. increments was added to get better stirring. The temperature was maintained at 67° C. where refluxing was steady. Another 100 cc. of water was added after 15 minutes. After ½ hour the temperature started to rise, and 10 minutes later had reached 90° C. and refluxing then stopped. Heating was continued until the temperature reached 95° C. and held there for 15 minutes. No further change was noted. A smooth stable, white emulsion resulted. Compared with a commercial polyvinyl acetate wood glue, it gave about 70% of the bond strength at a cost of about one-fifth.

*Example XVIII*

A mixture of 25 g. of 50% MACH-glue and 200 g. of water was heated with stirring. At a temperature of 75° C., 0.05 g. of potassium persulfate and 25 g. of acrylamide were added. The reaction was continued and at 95° C. the mixture began to thicken. 12.5 g. of methyl methacrylate monomer was then added and the mixture continued to thicken and at 99° C. there was added 50 cc. of water to get better stirring. After about an hour at 99–100° C. the refluxing had nearly stopped and the odor of monomeric methyl methacrylate was very faint. The emulsion which was stable, gave good flocculation and wood bond strengths.

*Example XIX*

MACH-glue, acrylamide, and methyl acrylate were reacted as in Example XVIII. The product was a thick white emulsion.

Examples and experiments were run to compare MACH-glue, acrylamide, styrene terpolymer with acrylamide, styrene copolymer. The tests showed that the terpolymer had a bond strength (p.s.i.) of 420 while the copolymer had a bond strength of 320.

As can be seen from the above, modified true copolymers can be produced in which one component is the modified protein carrying a chemically bonded polymerizable group, the other component being selected from the many well known vinyl monomers commercially available. Furthermore, preparations of polymerizable derivatives of two very different proteins, e.g. glue and casein, and then copolymerizing them is possible. One should also note that a mixture of acids can be used to form the ester when certain modified properties are desired.

The polymers produced by this invention can be used as water-soluble glue products which leave insoluble films after drying. They can be used in resin-protein wood adhesives having improved moisture resistance and reduced creep or cold flow or in glues for match head manufacture where high foaming tendency and high viscosities are required. The products can also be used as flocculating agents.

The polymerized, modified proteins produce clear, tough, continuous films. Preliminary tests have shown excellent adhesion for maple blocks, even though there was added some urea to peptize the normal gelation when high-test glue was the protein used.

Obviously, many modifications and variations of the invention as hereinbefore set forth may be made without departing from the spirit and scope thereof and, therefore, only such limitations should be imposed as are indicated in the appended claims.

We claim:

1. A modified protein substance comprising: the reaction product of a protein with a member selected from the group consisting of esters represented by the following formulas:

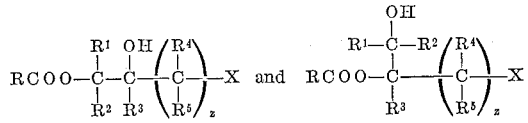

where X is selected from the group consisting of F, Cl, Br and I; R is the residue of an organic acid of 2–20 carbon atoms, and $R^1$, $R^2$, $R^3$, $R^4$ and $R^5$ are selected from the group consisting of hydrogen and alkyl radicals and z is an acyclic integer from 1 to about 10, said reaction being conducted under aqueous alkaline conditions.

2. A modified protein substance comprising: the reaction product of a protein with a member selected from the group consisting of esters represented by the following formulas:

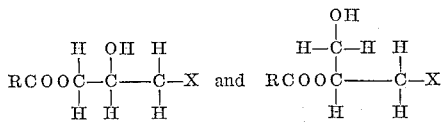

where X is a member selected from the group consisting of F, Cl, Br, and I and R is the residue of an acyclic organic acid of 2–20 carbon atoms, said reaction being conducted under aqueous alkaline conditions.

3. A modified protein substance comprising: the reaction product formed by reacting a protein with the methacrylic acid ester of glycerol halohydrin under aqueous alkaline conditions.

4. A method of producing a modified protein substance which comprises reacting a protein with a member selected from the group consisting of esters represented by the formulas:

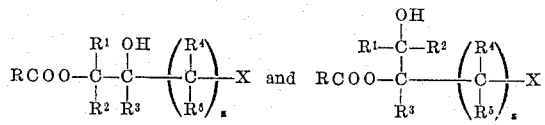

where X is selected from the group consisting of F, Cl, Br, and I; R is the residue of an acyclic organic acid of 2–20 carbon atoms; $R^1$, $R^2$, $R^3$, $R^4$, and $R^5$ are selected from the group consisting of hydrogen and alkyl radicals and z is an integer from 1 to about 10, said reaction being conducted under aqueous alkaline conditions.

5. As a composition of matter, the polymerization product of a vinyl monomer and a modified protein; said modified protein being formed by the reaction of a proteinaceous substance with an acyclic organic 2–20 carbon atom carboxylic acid ester of glycerol halohydrin under aqueous alkaline conditions.

6. As a composition of matter, the polymerization product of a vinyl monomer with a proteinaceous substance; said proteinaceous substance having been formed by the reaction of a protein with the methacrylic acid ester of glycerol halohydrin under aqueous alkaline conditions.

7. A composition of matter produced by the polymerization of a modified proteinaceous substance; said proteinaceous substance comprising the reaction product produced under aqueous alkaline conditions of a protein with a member selected from the group consisting of esters represented by the following formulas:

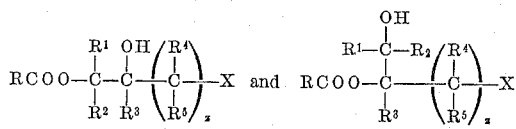

where X is selected from the group consisting of F, Cl, Br and I; R is the residue of an acyclic organic acid of 2–20 carbon atoms and $R^1$, $R^2$, $R^3$, $R^4$ and $R^5$ are selected from the group consisting of hydrogen and alkyl radicals and z is an integer from 1 to about 10.

8. The composition of claim 7 wherein the ester is the methacrylic acid ester of glycerol halohydrin.

9. A method for producing a polymer which comprises: the heating of a modified protein in the presence of a polymerization catalyst, said modified protein being formed by the reaction of a proteinaceous substance with an acyclic organic 2–20 carbon atom carboxylic acid ester of glycerol halohydrin under aqueous alkaline conditions.

10. A method for producing a polymer which comprises: the copolymerization of a vinyl monomer and a modified protein, said modified protein being formed by the reaction of a proteinaceous substance with an acyclic organic 2–20 carbon atom carboxylic acid ester of glycerol halohydrin under aqueous alkaline conditions.

References Cited by the Examiner
UNITED STATES PATENTS

| | | | |
|---|---|---|---|
| 2,548,520 | 4/1951 | Damschroder et al. | 260—112 |
| 2,780,608 | 2/1957 | Hurwitz et al. | 117—141 |
| 2,872,427 | 2/1959 | Shroeder | 260—6 |
| 2,882,250 | 4/1959 | Baker | 260—6 |

WILLIAM H. SHORT, *Primary Examiner.*

LEON J. BERCOVITZ, E. M. WOODBERRY, J. ZIEGLER, *Assistant Examiners.*

UNITED STATES PATENT OFFICE
CERTIFICATE OF CORRECTION

Patent No. 3,314,905                      April 18, 1967

Stewart B. Luce et al.

It is hereby certified that error appears in the above numbered patent requiring correction and that the said Letters Patent should read as corrected below.

Column 1, line 39, for "are" read -- art --; column 6, line 55, for "mearacrylate" read -- methacrylate --; column 8, line 59, for "organic" read -- acyclic organic --; line 62, strike out "acyclic".

Signed and sealed this 18th day of June 1968.

(SEAL)
Attest:

Edward M. Fletcher, Jr.               EDWARD J. BRENNER
Attesting Officer                Commissioner of Patents